(12) United States Patent  
Saigo

(10) Patent No.: US 8,941,785 B2  
(45) Date of Patent: Jan. 27, 2015

(54) PROJECTOR, IMAGE CORRECTION METHOD, AND PROGRAM

(71) Applicant: Seiko Epson Corporation, Tokyo (JP)

(72) Inventor: Manabu Saigo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/224,363

(22) Filed: Mar. 25, 2014

(65) Prior Publication Data

US 2014/0293133 A1  Oct. 2, 2014

(30) Foreign Application Priority Data

Mar. 27, 2013  (JP) .................. 2013-066098

(51) Int. Cl.
| | |
|---|---|
| H04N 3/23 | (2006.01) |
| H04N 9/28 | (2006.01) |
| H04N 9/31 | (2006.01) |
| H04N 5/74 | (2006.01) |

(52) U.S. Cl.  
CPC .................. *H04N 9/3179* (2013.01)  
USPC ........... 348/746; 348/745; 348/806; 348/607; 348/744; 348/747; 353/69; 353/70

(58) Field of Classification Search  
USPC ......... 348/746, 747, 745, 806, 744, 607, 807; 354/427; 353/69, 70  
See application file for complete search history.

(56) References Cited

U.S. PATENT DOCUMENTS

| | | | |
|---|---|---|---|
| 7,104,653 B2 * | 9/2006 | Moriwaki et al. .............. 353/69 |
| 2003/0210381 A1 * | 11/2003 | Itaki .............................. 353/70 |
| 2004/0257366 A1 | 12/2004 | Moriwaki et al. | |

FOREIGN PATENT DOCUMENTS

JP   A-2004-320662   11/2004

* cited by examiner

*Primary Examiner* — Jefferey Harold  
*Assistant Examiner* — Jean W Desir  
(74) *Attorney, Agent, or Firm* — Oliff PLC

(57) ABSTRACT

A projector includes a moving unit adapted to move positions of at least six correction points, which are included in a correcting image, a reception unit adapted to receive a designation on a value of a parameter representing linearity, a derivation unit adapted to derive a correspondence relationship of the coordinates between and input image and the correcting image using coordinates of the at least six correction points moved by the moving unit, and the parameter having the value designation of which is received by the reception unit, and a processing unit adapted to perform a correction process on the input image based on the correspondence relationship derived by the derivation unit.

15 Claims, 7 Drawing Sheets

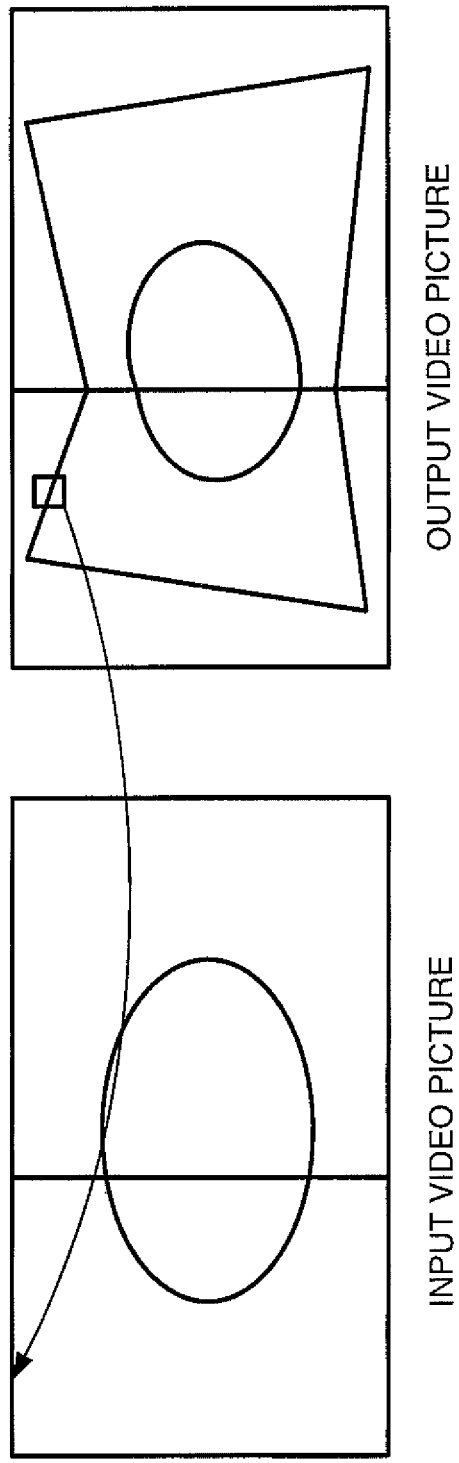

PROJECTOR, IMAGE CORRECTION METHOD, AND PROGRAM

The entire disclosure of Japanese Patent Application No. 2013-066098, filed Mar. 27, 2013, is expressly incorporated by reference herein.

BACKGROUND

1. Technical Field

The present invention relates to distortion correction of an image projected by a projector.

2. Related Art

In the case of, for example, projecting an image on the corner of wall surfaces, distortion correction of the distorted projection surface is performed in the projector. JP-A-2004-320662 (Document 1) discloses a technology of performing the distortion correction in the image projected on screens having a variety of shapes.

In the case of projecting an image on the corner of the wall surfaces, since the positional relationship between the corner and the image is arbitrary, in the technology described in Document 1, initial positions of the correction points for determining the outer shape of the image having been corrected need to be designated by the user.

SUMMARY

An advantage of some aspects of the invention is to provide a technology for correcting the distortion of the image projected on the corner of the wall surfaces with an easier operation.

An aspect of the invention provides a projector including a moving unit adapted to move positions of at least six correction points, which are included in a correcting image, a reception unit adapted to receive a designation on a value of a parameter representing linearity, a derivation unit adapted to derive a correspondence relationship of the coordinates between an input image and the correcting image using coordinates of the at least six correction points moved by the moving unit, and the parameter having the value designation of which is received by the reception unit, and a processing unit adapted to perform a correction process on the input image based on the correspondence relationship derived by the derivation unit.

According to the projector of the aspect of the invention, the distortion correction can be performed without designating which points are used as the correction points in the correcting image.

The derivation unit may calculate a projective transformation coefficient with respect to each of parts divided into by two of the at least six correction points, and then derive the correspondence relationship using the projective transformation coefficients calculated.

According to the projector of this configuration, the density of the image in each of the parts divided into by the two correction points can be adjusted.

The derivation unit may include a tentative derivation unit adapted to derive the correspondence relationship using the coordinates of the at least six correction points moved by the moving unit, and an adjustment unit adapted to adjust the correspondence relationship, which is derived by the tentative derivation unit, using the parameter having the value designation of which is received by the reception unit.

According to the projector of this configuration, the distortion correction can be performed by adjusting the correspondence relationship derived by the tentative derivation unit.

The adjustment unit may adjust the correspondence relationship while keeping an outer shape of the image constant.

According to the projector of this configuration, the linearity can be adjusted after improving the distortion of the image to be projected.

The adjustment unit may perform one of addition and subtraction of the parameter on a coordinate of at least predetermined one of the at least six correction points as the adjustment.

According to the projector of this configuration, the density of the image can be adjusted by addition or subtraction of the parameter.

Another aspect of the invention provides an image correction method including moving positions of at least six correction points, which are included in a correcting image, receiving a designation on a value of a parameter representing linearity, deriving a correspondence relationship of the coordinates between an input image and the correcting image using coordinates of the at least six correction points moved, and the parameter having the value designation of which is received, and performing a correction process on the input image based on the correspondence relationship derived.

According to the image correction method of the aspect of the invention, the distortion correction can be performed without designating which points are used as the correction points in the correcting image.

Still another aspect of the invention provides a computer-readable recording medium having a program recorded therein, the program making the computer perform a process including moving positions of at least six correction points, which are included in a correcting image, receiving a designation on a value of a parameter representing linearity, deriving a correspondence relationship of the coordinates between an input image and the correcting image using coordinates of the at least six correction points moved, and the parameter having the value designation of which is received, and performing a correction process on the input image based on the correspondence relationship derived.

According to the recording medium of the aspect of the invention, the distortion correction can be performed without designating which points are used as the correction points in the correcting image.

BRIEF DESCRIPTION OF THE DRAWINGS

The invention will be described with reference to the accompanying drawings, wherein like numbers reference like elements.

FIGS. 7A and 7B are diagrams showing an example of a correspondence relationship of coordinates.

DESCRIPTION OF AN EXEMPLARY EMBODIMENT

1. Outline

Figure 1B:
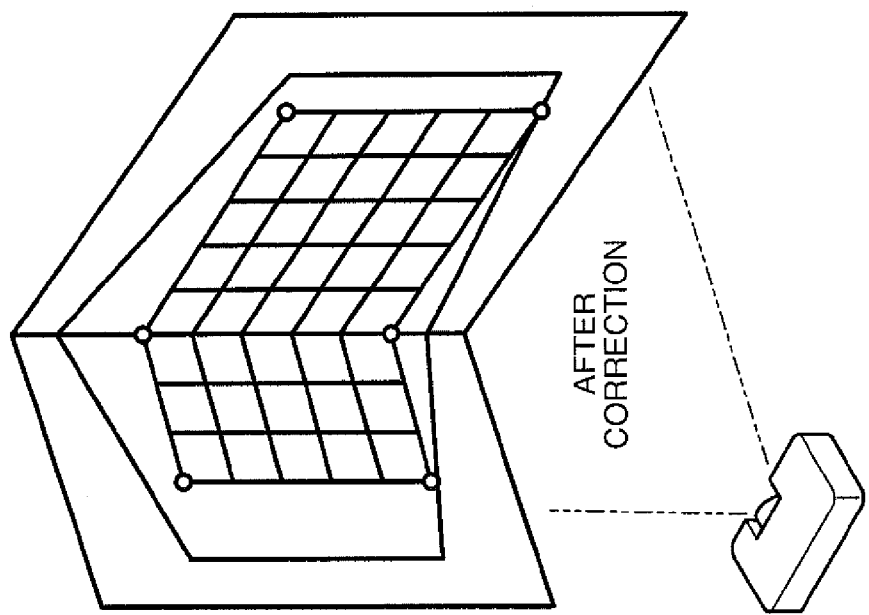
FIGS. 1A and 1B are diagrams for explaining a problem of the related art.
Figure 1A:
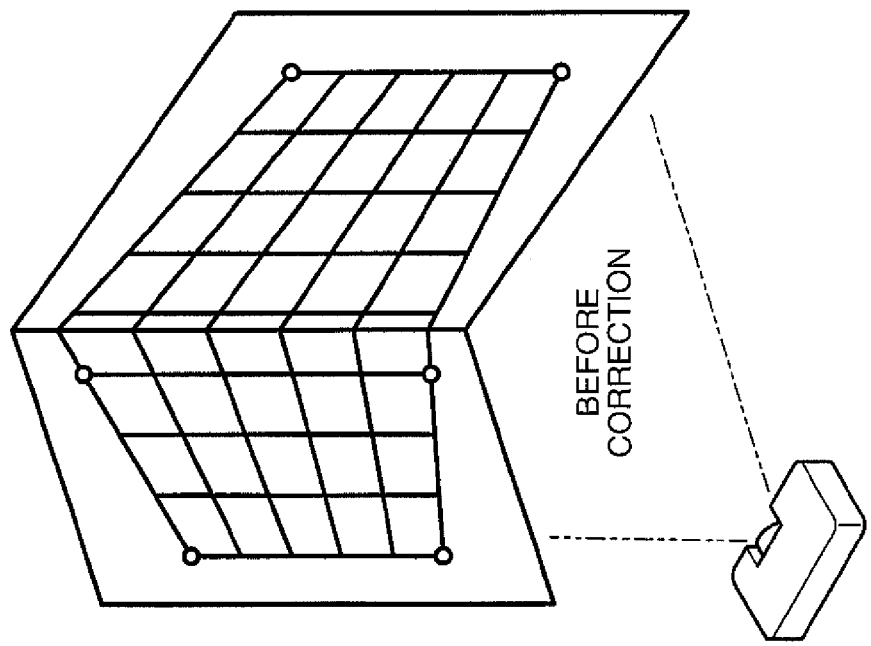

FIGS. 1A and 1B are diagrams for explaining a problem of the related art. Here, the explanation will be presented using an example of projecting a video picture (an image) from the projector toward a corner of a wall folded at an angle of 90°. FIG. 1A shows the state before a distortion correction (a geometrical correction), and FIG. 1B shows the state after the distortion correction. In FIGS. 1A and 1B, the image projected is expressed with a 5×8 grid (the same applies to FIG. 2 and the following drawings). When projecting an image toward the corner of the folded wall, the angle formed between a projection lens and the screen is different between one side and the other side of the corner (in the example shown in FIGS. 1A and 1B, the right side and the left side across the corner). Therefore, in order to make each of the areas, where the image is displayed, have a rectangular shape, the distortion correction is performed separately on each of the right side and the left side of the corner. In order to define the area on which the distortion correction is performed, two points corresponding to the corner are used as the correction points in the distortion correction in addition to the four vertexes of the display area (the correction points are indicated by "○" in FIGS. 1A and 1B).

Figure 2:
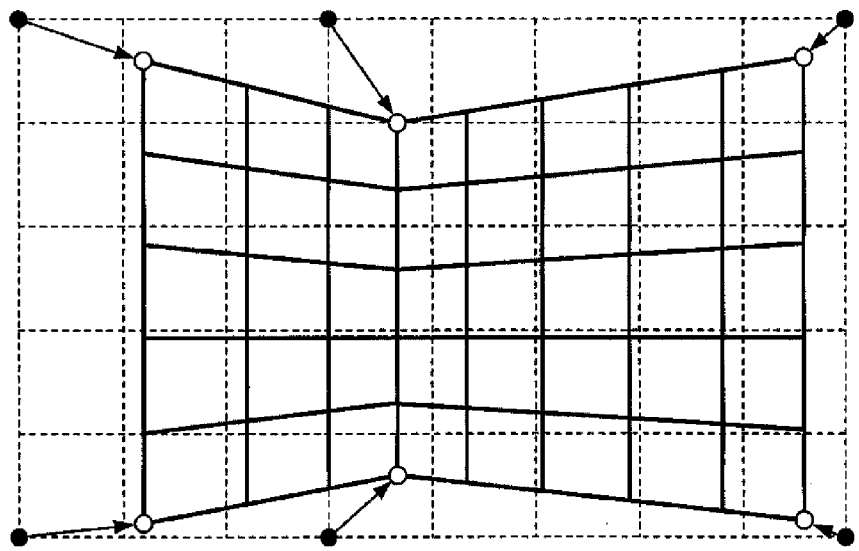
FIG. 2 is a diagram showing an example of positions of correction points before and after the movement.

FIG. 2 is a diagram showing an example of positions of the correction points before and after the movement. Those shown in FIG. 2 are the coordinates on a light modulator (e.g., a liquid crystal panel) of the projector. In FIG. 2, the black circles represent the correction points before the movement, and the white circles represent the correction points after the movement. In the present example, the two points, namely the point on the upper side and the point on the lower side, are the correction points (hereinafter the two correction points are each referred to as a "specific correction point") in addition to the four vertexes of the image projected. Since the positional relationship between the image projected and the corner of the wall is different by the moment, it is necessary for the positions of the specific correction points on this image to be able to arbitrarily be designated. In other words, the proportion at which the points to be used as the specific correction points should divide the upper side (and the lower side) of the image is determined in accordance with a user instruction. However, in the projector, the user interface (UI) for performing the movement of these correction points can be provided by so-called OSD (On Screen Display) in some cases. In such cases, it is difficult to implement the UI, which makes it possible to designate an arbitrary point on the image as the correction point, in the projector. Further, even if the UI, which makes it possible to designate an arbitrary point on the image as the correction point, is provided, which points are selected as the specific correction points (i.e., what proportion the division of the right side and the left side is performed at) must be determined by the user. On this occasion, it is difficult to change the correction point having been determined once to another point.

The present embodiment is for coping with this problem, and provides the technology of performing the distortion correction with respect to the corner projection using the correction points having the initial positions on the image determined previously.

2. Configuration

Figure 3:
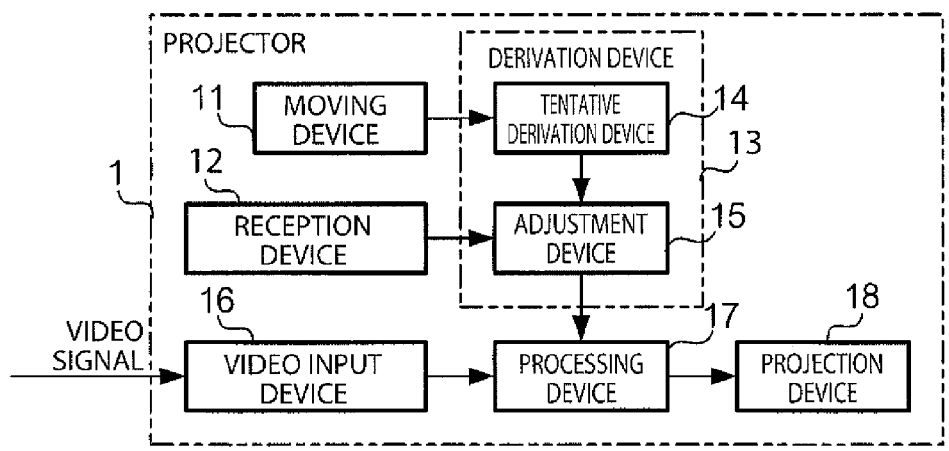
FIG. 3 is a diagram showing a functional configuration of a projector according to an embodiment of the invention.

FIG. 3 is a diagram showing a functional configuration of the projector 1 according to the present embodiment. The projector 1 includes a moving unit 11, a reception unit 12, a derivation unit 13, a video input unit 16, a processing unit 17, and a projection unit 18. The video input unit 16 receives a video signal (hereinafter referred to as an "input video signal," and the image represented by the input video signal is referred to as an "input image") from an external device (e.g., a personal computer or a DVD player), and then supplies the processing unit 17 with the video signal thus received. The moving unit 11 moves the positions of at least six correction points included in the correcting image (the correcting image) in accordance with the instruction of the user. The correcting image is an image used for the distortion correction, and has a predetermined shape with respect to the input image. The initial positions of these correction points are located at predetermined positions in the correcting image. The user designates a value of a parameter representing the linearity, and the reception unit 12 receives the designation by the user. The derivation unit 13 includes a tentative derivation unit 14 and an adjustment unit 15. The tentative derivation unit 14 derives a correspondence relationship of the coordinates between the input image and the correcting image, which is determined by the correction points after the movement, using the coordinates of at least six correction points moved by the moving unit 11. The adjustment unit 15 adjusts the correspondence relationship derived by the tentative derivation unit 14 using the parameter having the value, designation of which is received by the reception unit 12. The processing unit 17 performs the correction process on the input image based on the correspondence relationship adjusted by the adjustment unit 15. The projection unit 18 projects the image on which the correction process is performed by the processing unit 17.

Figure 4:
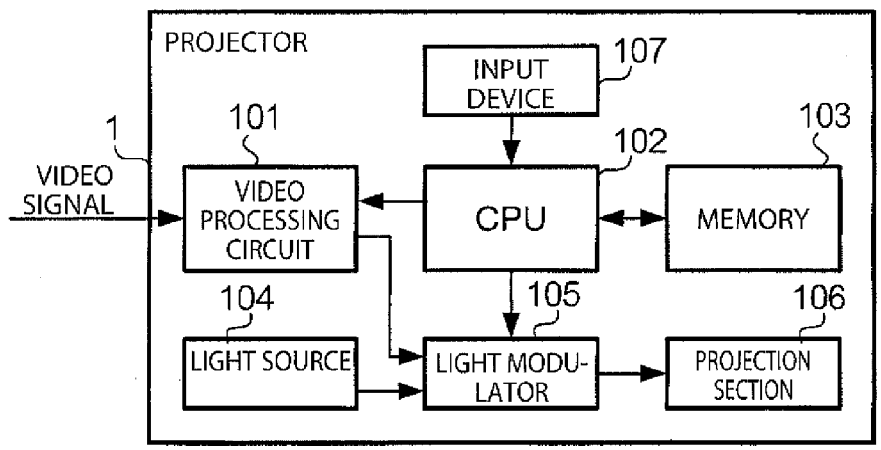
FIG. 4 is a diagram showing a hardware configuration of the projector.

FIG. 4 is a diagram showing a hardware configuration of the projector 1. The projector 1 includes a video processing circuit 101, a CPU 102, a memory 103, a light source 104, a light modulator 105, a projection section 106, and an input unit 107. The video processing circuit 101 performs the video processing on the input video signal, and then outputs the signal obtained by performing the video processing on the input video signal to the light modulator 105. The CPU 102 is a control unit for controlling each of the constituents of the projector 1. For example, the CPU 102 outputs a signal, which is for displaying a different image such as a so-called OSD than the input image alone or overlapping the input image, to the light modulator 105. The memory 103 is a storage unit for storing a program and a variety of types of data. The light source 104 is a device for outputting projection light, and includes a light emitting device such as a lamp or a laser, and a drive circuit of the light emitting device. The light modulator 105 is a device for modulating the light output from the light source 104 in accordance with the signal output from the video processing circuit 101, and includes an electrooptical device such as a liquid crystal panel or a digital mirror device (DMD), and a drive circuit of the electrooptical device. The projection section 106 is a device for projecting the light modulated by the light modulator 105 on a screen (not shown), and includes an optical system such as a dichroic prism, a projection lens, and a focus lens. The input unit 107 is a device used by the user for inputting an instruction or information to the projector 1 (the CPU 102), and includes, for example, a keypad, a touch screen, or a remote controller.

The CPU 102 executing a control program for the distortion correction is an example of the moving unit 11 and the derivation unit 13. The input unit 107 is an example of the reception unit 12. The video processing circuit 101 is an example of the processing unit 17. The projection section 106 is an example of the projection unit 18. An A/D converter (not shown) disposed in the anterior stage of the video processing circuit 101 is an example of the video input unit 16.

3. Action

Figure 5:
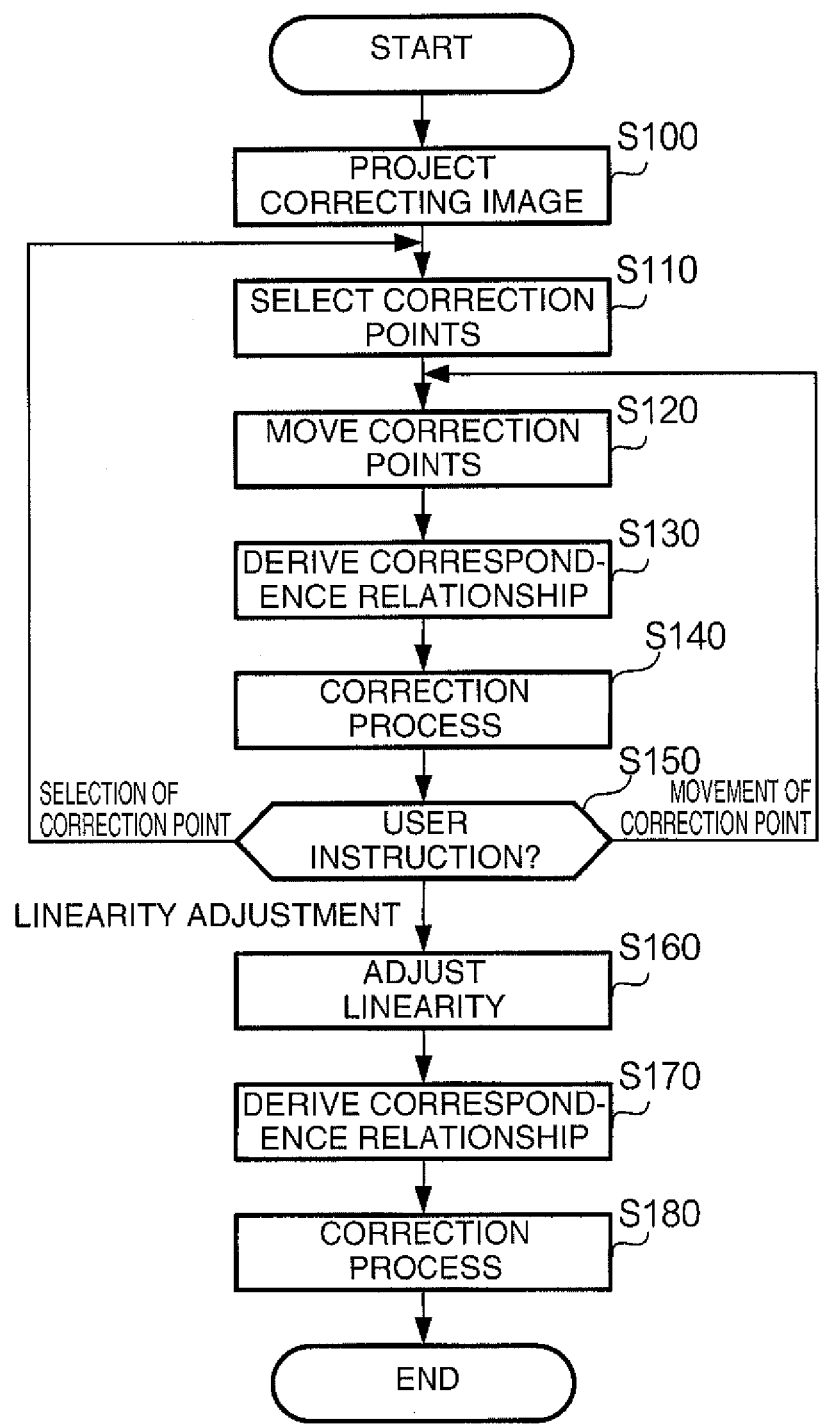
FIG. 5 is a flowchart showing an operation of the projector.

FIG. 5 is a flowchart showing the action of the projector 1. The flow shown in FIG. 5 is triggered by the fact that the user instructs the commencement of the distortion correction via, for example, the input unit 107. It should be noted that in the present example, the projector 1 projects the image toward the corner folded as shown in FIGS. 1A and 1B.

In the step S100, the projector 1 projects the correcting image. The correcting image is an image including at least six correction points. In the present embodiment, the initial positions of these correction points are fixed.

Figure 6:
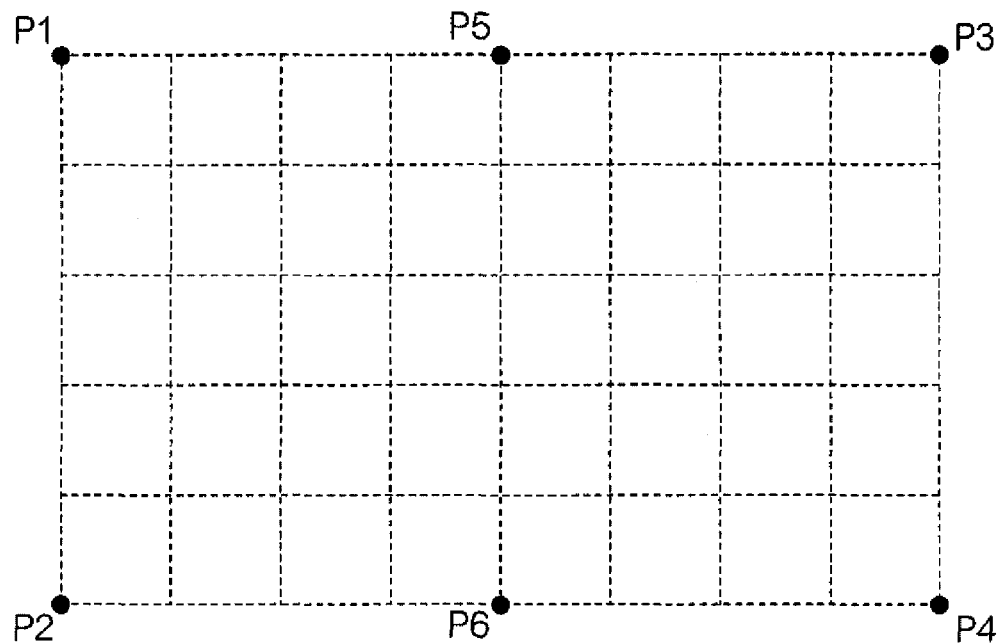
FIG. 6 is a diagram showing an example of a correcting image.

FIG. 6 is a diagram showing an example of the correcting image. In the present example, the correcting image includes the six correction points. The correcting image has a rectangular shape, and the four correction points among the six correction points are the vertexes of the rectangle. In FIG. 6, the correction points corresponding to these four vertexes are denoted as P1 through P4. Further, the midpoints of the upper side and the lower side of the rectangle correspond to the other two of the six correction points. In FIG. 6, the correction points corresponding to these midpoints are denoted as P5 and P6.

FIG. 5 is referred to again. In the step S110, the projector 1 selects one of the correction points to be the target of the process in accordance with the instruction of the user. The selection of the correction point is performed in, for example, the following manner. The CPU 102 makes the light modulator 105 display the screen for selecting the one correction point to be the target of the process among the six correction points. The user operates the input unit 107 to select the one of the correction points to be the target of the process. The CPU 102 controls the light modulator 105 so as to display the selected one of the correction points with an appearance (e.g., with a color different from the color of the other correction points) different from the other correction points.

In the step S120, the projector 1 moves the selected one of the correction points in accordance with the instruction of the user. The movement of the correction point is performed in, for example, the following manner. The CPU 102 makes the light modulator 105 display the screen for moving the selected one of the correction points. The user inputs the instruction of the position of the selected one of the correction points through the input unit 107. The CPU 102 controls the light modulator 105 so as to move the correction point to the position, which has been moved in accordance with the instruction thus input.

In the step S130, the projector 1 derives the correspondence relationship of the coordinates between the input image and the correcting image (the output image) determined by the correction points after the movement. The derivation of the correspondence relationship is separately performed in each of the two areas divided into by a straight line connecting the two correction points (the point P5 and the point P6) other than the vertexes among the six correction points.

FIGS. 7A and 7B are diagrams showing an example of the correspondence relationship of the coordinates. FIGS. 7A and 7B respectively show the input image and the output image. The outer frame shown in FIGS. 7A and 7B represents the outer shape of the display area (e.g., the display area of the liquid crystal panel) of the light modulator 105. In the present example, the relationship of the projective transformation exists between the input image and the output image with respect to each of the two areas, and the grayscale value of an arbitrary pixel (coordinate) in the output image can be obtained by looking up the grayscale value of the corresponding position (coordinate) in the input image. The relationship expressed by Formula 1 below exists between the pixel (x, y) in the input image and the pixel (X, Y) in the output image.

Formula 1

$$x = \frac{AX + BY + C}{GX + HY + 1} \quad (1)$$
$$y = \frac{DX + EY + F}{GX + HY + 1}$$

Here, A, B, C, D, E, F, G, and H are each a coordinate transformation coefficient (a projective transformation coefficient), and can be obtained by solving the simultaneous equations with eight unknowns of Formula 2 below.

Formula 2

$$\begin{pmatrix} X_0 & Y_0 & 1 & 0 & 0 & 0 & -x_0X_0 & -x_0Y_0 \\ 0 & 0 & 0 & X_0 & Y_0 & 1 & -y_0X_0 & -y_0Y_0 \\ X_1 & Y_1 & 1 & 0 & 0 & 0 & -x_1X_1 & -x_1Y_1 \\ 0 & 0 & 0 & X_1 & Y_1 & 1 & -y_1X_1 & -y_1Y_1 \\ X_2 & Y_2 & 1 & 0 & 0 & 0 & -x_2X_2 & -x_2Y_2 \\ 0 & 0 & 0 & X_2 & Y_2 & 1 & -y_2X_2 & -y_2Y_2 \\ X_3 & Y_3 & 1 & 0 & 0 & 0 & -x_3X_3 & -x_3Y_3 \\ 0 & 0 & 0 & X_3 & Y_3 & 1 & -y_3X_3 & -y_3Y_3 \end{pmatrix} \begin{pmatrix} A \\ B \\ C \\ D \\ E \\ F \\ G \\ H \end{pmatrix} = \begin{pmatrix} x_0 \\ y_0 \\ x_1 \\ y_1 \\ x_2 \\ y_2 \\ x_3 \\ y_3 \end{pmatrix} \quad (2)$$

Here, (x0, y0), (x1, y1), (x2, y2), and (x3, y3) represent the coordinates of the correction points before the movement, and (X0, Y0), (X1, Y1), (X2, Y2), and (X3, Y3) represent the coordinates of the correction points after the movement. The coordinates are the coordinates of the display area of the light modulator 105 (the coordinates on the liquid crystal panel). The CPU 102 derives the correspondence relationship of the coordinates between the input image and the output image with Formula 1. Specifically, the CPU 102 generates a coordinate table having the position (coordinate) of each of the pixels in the output image and the position (coordinate) on the input image corresponding to this position associated with each other, and then stores the coordinate table in the memory 103. It should be noted that coordinate table is not required to include the correspondence relationship with respect to all of the pixels in the output image, but it is also possible to arrange that the correspondence relationship is included at predetermined pixel intervals and the corresponding relationship with respect to the pixels not included in the coordinate table is interpolated using, for example, linear interpolation.

FIG. 5 is referred to again. After deriving the input-output correspondence relationship in the step S130, the projector 1 performs the correction process on the input image based on the correspondence relationship and then projects the output image obtained by the process in the step S140. Specifically, the video processing circuit 101 controls the light modulator 105 so as to project the output image. Here, the video processing circuit 101 determines the grayscale value of each of the pixels of the output image with reference to the grayscale value of the corresponding coordinate (reference coordinate) on the input image. On this occasion, the video processing circuit 101 determines the grayscale value using, for example, a filtering process based on the grayscale values of a plurality of pixels located in the periphery of the reference coordinate.

In the step S150, the projector 1 branches the process in accordance with the instruction of the user. In the case in which the selection of the correction point is instructed (SELECTION OF CORRECTION POINT in the step S150), the projector 1 makes a transition of the process to the step S110. In the case in which the re-movement of the correction point presently selected is instructed (MOVEMENT OF CORRECTION POINT in the step S150), the projector 1 makes a transition of the process to the step S120. In the case in which the adjustment of the linearity is instructed (LINEARITY ADJUSTMENT in the step S150), the projector 1 makes a transition of the process to the step S160.

In the step S160, the projector 1 adjusts the linearity in accordance with the instruction of the user. The linearity is a parameter representing expansion and contraction of the image in a certain direction (a horizontal direction in the present example), and is denoted here as elax. The initial value of the parameter elax is zero, and can be adjusted in predetermined positive and negative ranges (e.g., −12≤elax≤12) based on zero.

Figure 8A:
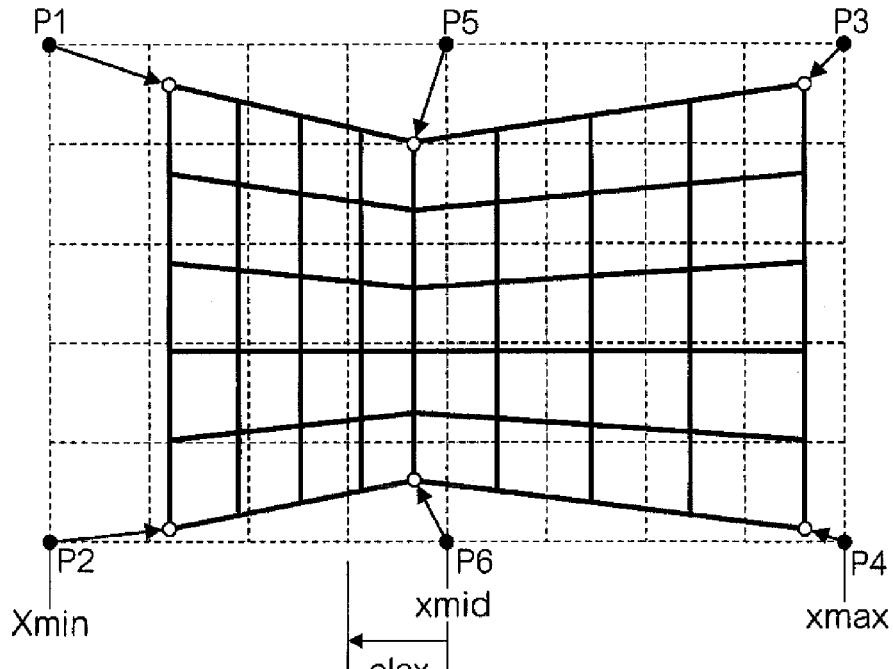
FIGS. 8A and 8B are diagrams for explaining linearity.
Figure 8B:
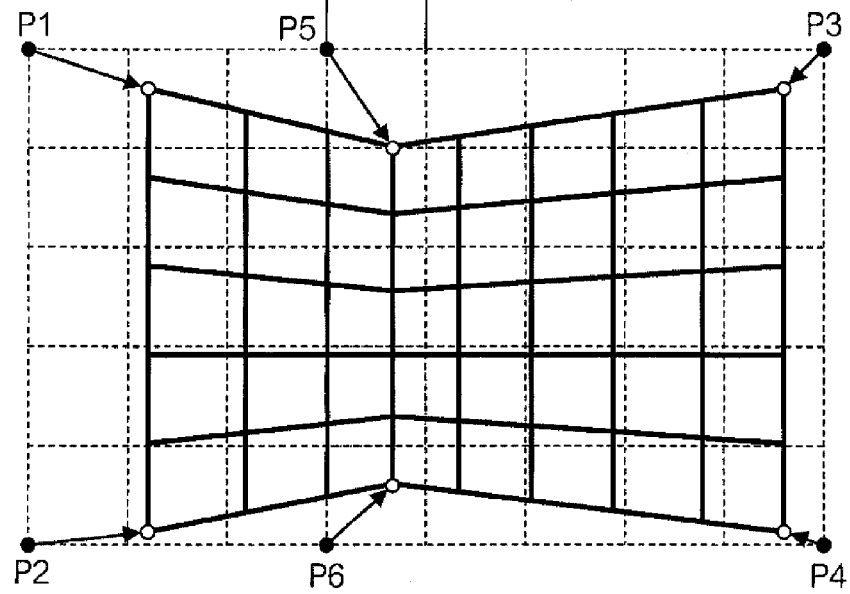

FIGS. 8A and 8B are diagrams for explaining the linearity. FIG. 8A shows an example before the linearity adjustment, and FIG. 8B shows an example after the linearity adjustment. Symbols xmin and xmax denote the minimum value and the maximum value of the coordinates of the correction points, namely the coordinate of the both ends of the correcting image in the x direction. In the present example, the outer shape of the correcting image is constant before and after the adjustment of the linearity. In other words, since the coordinates of the both ends of the correcting image in the x direction do not change, the moving amount of the pixel is zero in each of the xmin and the xmax. The moving amount increases in the direction from the xmin to the xmid, and decreases in the direction from the xmid to the xmax. The xmid is the x coordinate where the moving amount becomes the maximum, and is equal to the x coordinate of the correction points P5 and P6 in the present example. The maximum value of the moving amount is the elax.

Figure 9:
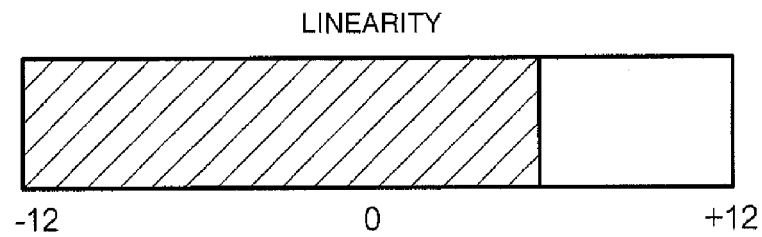
FIG. 9 is a diagram showing an example of a user interface (UI) for a linearity adjustment.

FIG. 9 is a diagram showing an example of a user interface (UI) for the linearity adjustment. In this example, the present value of the parameter elax is indicated by a bar. The present value of the parameter elax varies in accordance with the instruction of the user. For example, in the case in which the input unit 107 is provided with a "+" key (a plus key) and a "−" key (a minus key), when the user presses the "+" key, the present value of the parameter elax increases, while the user presses the "−" key, the present value of the parameter elax decreases.

FIGS. 8A and 8B are referred to again. In this example, the adjustment of the linearity is performed by adding the parameter elax to the x coordinates of the correction points P5 and P6, or subtracting the parameter elax from the x coordinates of the correction points P5 and P6. Specifically, the coordinates of the correction points after the linearity adjustment are as follows.

Regarding the Left Side Part of the Correcting Image:
 Before the movement: (x1, y1), (x5−elax, y5), (x6−elax, y6), and (x2, y2)
 After the movement: (X1, Y1), (X5, Y5), (X6, Y6), and (X2, Y2)
Regarding the Right Side Part of the Correcting Image:
 Before the movement: (x5+elax, y5), (x3, y3), (x4, y4), and (x6+elax, y6)
 After the movement: (X5, Y5), (X3, Y3), (X4, Y4), and (X6, Y6)

In the step S170, the CPU 102 calculates the coordinate transformation coefficients A through G using the coordinates of the correction points after the linearity adjustment and Formula 2. The CPU 102 derives the correspondence relationship between the input image and the output image using the coordinate transformation coefficients A through G newly calculated and Formula 1. Then, in the step S180, the video processing circuit 101 performs the correction process on the input image based on the correspondence relationship newly derived. In the example shown in FIGS. 8A and 8B, before the linearity adjustment, the grid with four columns is displayed in each of the left side part and the right side part (FIG. 8A). In contrast, after the linearity adjustment, a grid with three columns is displayed in the left side part, and a grid with five columns is displayed in the right side part, and thus, the left side is adjusted (corrected) so as to be coarser, while the right side is adjusted (corrected) so as to be denser.

Figure 10:
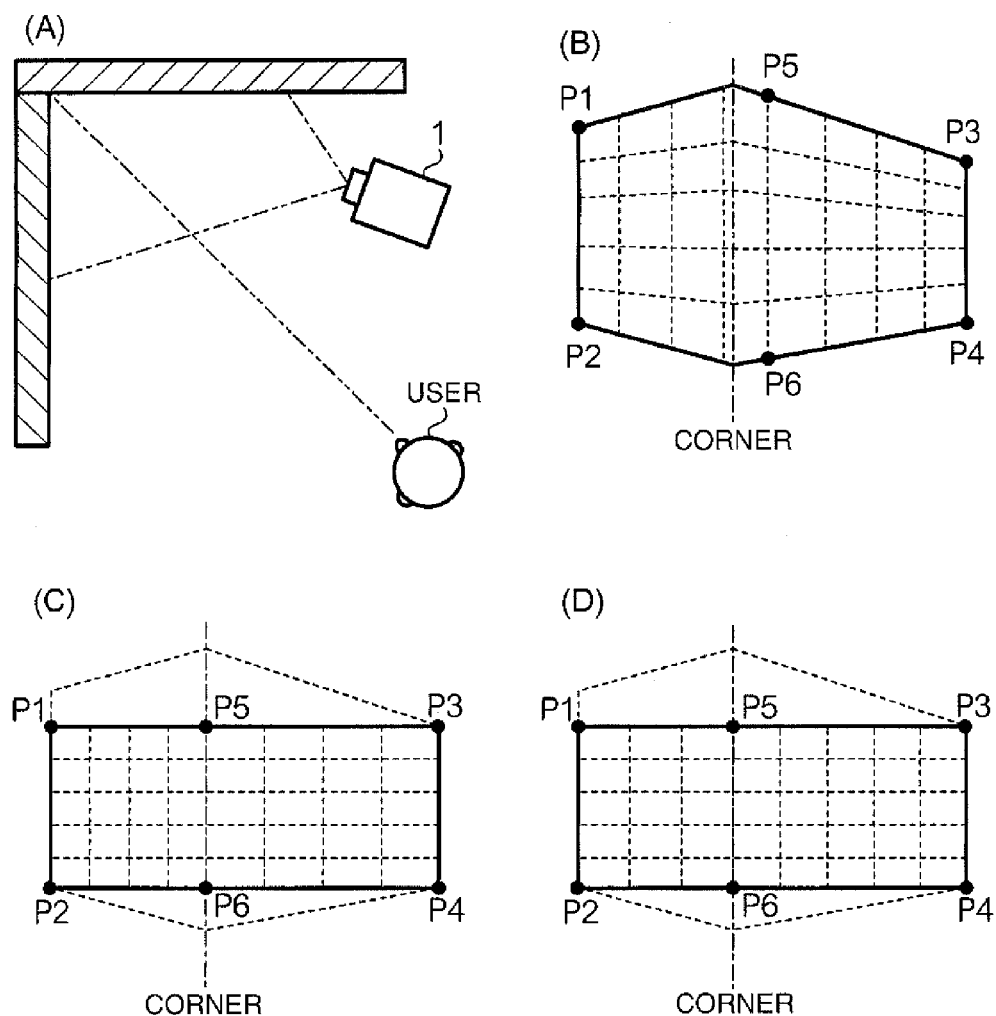
FIGS. 10A through 10D are diagrams for explaining an advantage of the present embodiment.

FIGS. 10A through 10D are diagrams for explaining an advantage of the present embodiment. FIG. 10A schematically shows the positional relationship between the wall, the projector 1, and the user (the viewer of the image) viewed from above. The wall is folded at an angle of 90°. The projector 1 projects the image from a position nearer to one of the wall planes (the upper wall plane in the drawing) toward the corner of the wall. The user views the image in front (a position on the bisector of the angle formed between the two wall planes) of the two wall planes.

FIG. 10B shows the correcting image in the initial state. Here, there is shown the correcting image projected on the wall and viewed from the user. Due to the positional relationship between the projector 1 and the wall, the correcting image projected on the wall is distorted. The user moves the positions of the correction points P1 through P6 to thereby improve the distortion.

FIG. 10C shows the correcting image after moving the correction points P1 through P6. In this example, since the image is projected from the position nearer to the left wall plane, the left side of the image is relatively denser, and the right side is relatively coarser. The user adjusts the linearity to improve the imbalance in density of the image between the left side and the right side.

FIG. 10D shows the correcting image in the state in which the distortion correction has been completed. The distortion of the image is resolved, and the density of the image is homogenized between the left side and the right side of the corner of the wall. As explained hereinabove, according to the present embodiment, the distortion and the imbalance in the density of the image can be improved without requiring the user to designate the positions of the correction points P5 and P6 in the correcting image, namely without requiring the user to designate which points on the sides of the rectangle are used as the correction points P5 and P6.

4. Modified Examples

The invention is not limited to the embodiment described above, but can be put into practice with a variety of modifications. Hereinafter, some modified examples will be explained. It is also possible to use two or more of the modified examples described below in combination.

The adjustment method of the linearity is not limited to the method explained as the embodiment. For example, the adjustment of the linearity can also be performed by multiplying the x-coordinates of the correction points P5 and P6 by the parameter elax. On this occasion, the initial value of the parameter elax is one but not zero.

The positions of the correction points in the correcting image, in particular the positions of the correction points other than the vertexes of the rectangle, are not limited to those explained in the description of the embodiment. For example, points other than the midpoints of the upper side and the lower side can also be used as the correction points P5 and 26. Further, although in the embodiment, it is assumed that the image is projected on the corner formed of two, namely right and left, walls, and the example in which the points on the upper side and the lower side are used as the correction points P5 and P6 is explained, in the case of projecting the image on the corner formed of the two, namely upper and lower, walls, points on the right side and the left side can also be used as the correction points P5 and P6. Further, in order to make it possible to correspond to both of the corner formed of the two right and left walls and the corner formed of the two upper and lower walls, the correction points can be disposed on all of the upper and lower sides and the right and left sides.

In the description of the embodiment, the explanation is presented using the example in which the x-coordinates of the point P5 and the point P6 are equal to each other. However, the x-coordinates of the point P5 and the point P6 can also be different from each other. In this case, the parameter elax becomes the function of y, and the xmid shown in FIGS. 8A and 8B is separately determined in each of the upper side and the lower side.

In the embodiment described above, the distortion correction is performed in two steps, namely the step in which the tentative derivation unit 14 derives the correspondence relationship between the input image and the output image based on the coordinates of the correction points, and the step in which the adjustment unit 15 adjusts the correspondence relationship based on the parameter elax. However, the correspondence relationship can also be derived in a lump using the coordinates of the correction points and the parameter elax.

The hardware configuration for realizing the functions explained in FIG. 3 is not limited to the configuration explained with reference to FIG. 4. For example, a part or the whole of the functions, which are explained to be provided to the video processing circuit 101 in the embodiment, can be provided to the CPU 102.

Further, it is also possible to perform the distortion correction by recording the program for realizing the functional sections in FIG. 3 on a computer-readable recording medium, and then making the computer system retrieve and then execute the program recorded on the recording medium. It should be noted that the "computer system" mentioned here should include an OS and the hardware such as peripheral devices.

Further, in the case of using the WWW system, the "computer system" should also include a home page providing environment (or display environment).

Further, the "computer-readable recording medium" denotes a portable recording medium such as a flexible disk, a magneto-optical disk, a ROM, and a CD-ROM, and a storage device such as a hard disk incorporated in the computer system. Further, the "computer-readable recording medium" should include those holding a program for a certain period of time such as a volatile memory (a RAM) in a computer system to be a server or a client in the case of transmitting the program via a network such as the Internet, or a communication line such as a telephone line. Further, the program described above can be a program for partially realizing the functions described above, or a program capable of realizing the functions described above in combination with a program having already been recorded on the computer system.

What is claimed is:

1. A projector comprising:
   a moving unit adapted to move positions of at least six correction points, which are included in a correcting image;
   a reception unit adapted to receive a designation on a value of a parameter representing linearity;
   a derivation unit adapted to derive a correspondence relationship of the coordinates between an input image and the correcting image using coordinates of the at least six correction points moved by the moving unit, and the parameter having the value designation of which is received by the reception unit; and
   a processing unit adapted to perform a correction process on the input image based on the correspondence relationship derived by the derivation unit.

2. The projector according to claim 1, wherein the derivation unit calculates a projective transformation coefficient with respect to each of parts divided into by two of the at least six correction points, and then derives the correspondence relationship using the projective transformation coefficients calculated.

3. The projector according to claim 1, wherein the derivation unit includes
   a tentative derivation unit adapted to derive the correspondence relationship using the coordinates of the at least six correction points moved by the moving unit, and
   an adjustment unit adapted to adjust the correspondence relationship, which is derived by the tentative derivation unit, using the parameter having the value designation of which is received by the reception unit.

4. The projector according to claim 3, wherein the adjustment unit adjusts the correspondence relationship while keeping an outer shape of the image constant.

5. The projector according to claim 3, wherein the adjustment unit performs one of addition and subtraction of the parameter on a coordinate of at least predetermined one of the at least six correction points as the adjustment.

6. An image correction method comprising:
   moving positions of at least six correction points, which are included in a correcting image;
   receiving a designation on a value of a parameter representing linearity;
   deriving a correspondence relationship of the coordinates between an input image and the correcting image using coordinates of the at least six correction points moved, and the parameter having the value designation of which is received; and
   performing a correction process on the input image based on the correspondence relationship derived.

7. The image correction method according to claim 6, wherein
   in the deriving, a projective transformation coefficient is calculated with respect to each of parts divided into by two of the at least six correction points, and then the correspondence relationship is derived using the projective transformation coefficients calculated.

8. The image correction method according to claim 6, wherein
   the deriving includes
      tentatively deriving the correspondence relationship using the coordinates of the at least six correction points moved in the moving, and adjusting the correspondence relationship, which is derived in the deriving, using the parameter having the value designation of which is received in the receiving.

9. The image correction method according to claim 8, wherein
in the adjusting, the correspondence relationship is adjusted while keeping an outer shape of the image constant.

10. The image correction method according to claim 8, wherein
in the adjusting, one of addition and subtraction of the parameter is performed on a coordinate of at least predetermined one of the at least six correction points as the adjustment.

11. A computer-readable recording medium having a program recorded,
the program making the computer perform a process comprising:
moving positions of at least six correction points, which are included in a correcting image;
receiving a designation on a value of a parameter representing linearity;
deriving a correspondence relationship of the coordinates between an input image and the correcting image using coordinates of the at least six correction points moved, and the parameter having the value designation of which is received; and
performing a correction process on the input image based on the correspondence relationship derived.

12. The computer-readable recording medium according to claim 11, wherein
in the deriving, a projective transformation coefficient is calculated with respect to each of parts divided into by two of the at least six correction points, and then the correspondence relationship is derived using the projective transformation coefficients calculated.

13. The computer-readable recording medium according to claim 11, wherein
the deriving includes
tentatively deriving the correspondence relationship using the coordinates of the at least six correction points moved in the moving, and
adjusting the correspondence relationship, which is derived in the deriving, using the parameter having the value designation of which is received in the receiving.

14. The computer-readable recording medium according to claim 13, wherein
in the adjusting, the correspondence relationship is adjusted while keeping an outer shape of the image constant.

15. The computer-readable recording medium according to claim 13, wherein
in the adjusting, one of addition and subtraction of the parameter is performed on a coordinate of at least predetermined one of the at least six correction points as the adjustment.

* * * * *